Nov. 17, 1964     A. R. KISHLINE     3,157,428
VEHICLE BODY CONSTRUCTION
Filed Aug. 6, 1962
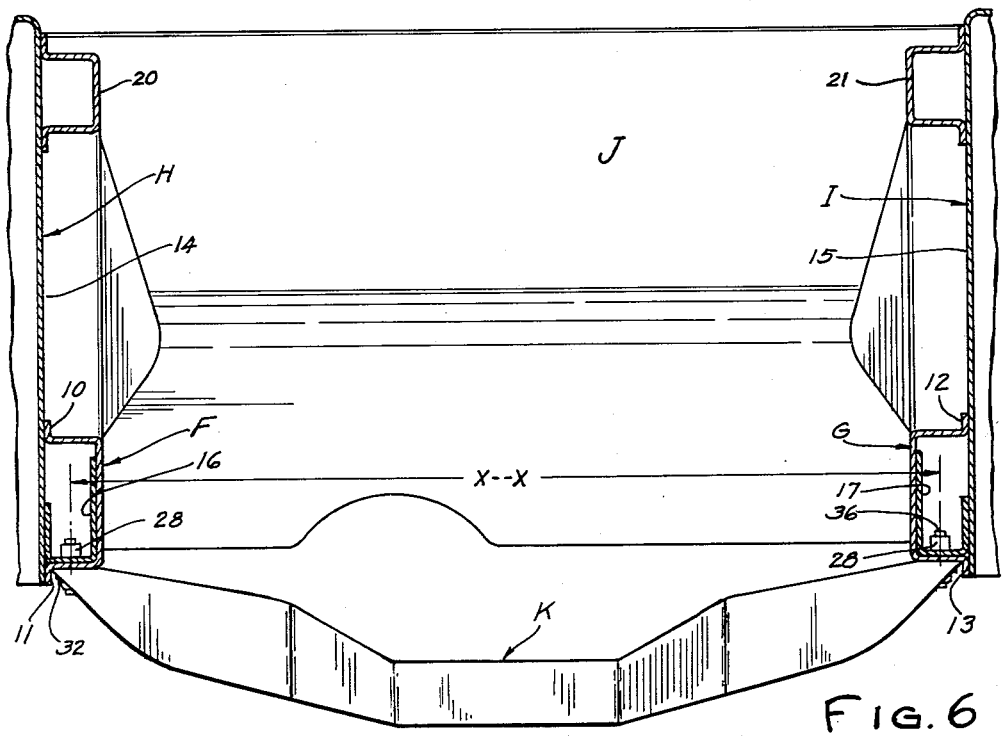
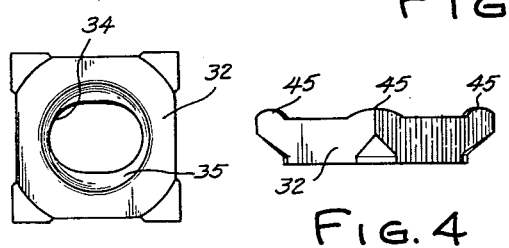
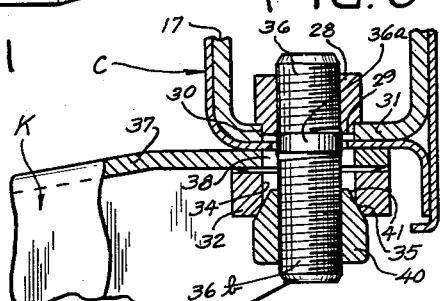
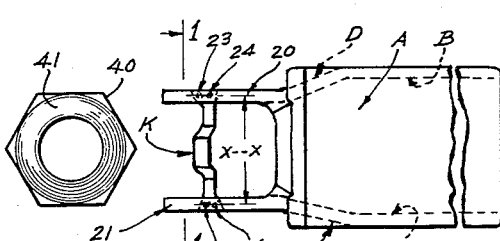
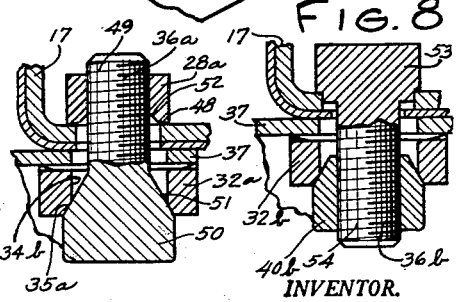
INVENTOR.
ALAN R. KISHLINE
Carl J. Barbee
ATTORNEY

3,157,428
VEHICLE BODY CONSTRUCTION
Alan R. Kishline, Kenosha, Wis., assignor to American Motors Corporation, Kenosha, Wis., a corporation of Maryland
Filed Aug. 6, 1962, Ser. No. 215,182
7 Claims. (Cl. 296—28)

The invention relates to an automotive vehicle body and the structural details thereof. The invention has particular reference to a vehicle body of unitary type construction wherein most of the structural members which make up the body are welded together integrally. In a vehicle body of this type, the primary frame members are welded integrally with various sheet metal panels which make up the body structure.

In a vehicle body employing sills which protrude beyond the terminus of the floor panel, problems are incurred with reference to maintaining the sill members a predetermined distance apart. A cross member or brace is usually employed and when this is removed temporarily, such as when servicing the engine, then front wheel alignment problems arise upon replacing the engine and cross brace.

The principal object of the invention then is to provide a structural cross brace or member which extends between the spaced sills and is anchored thereto in a manner as to assure correct spacing of the sills, thereby eliminating any need for adjusting the alignment conditions of the front wheels after the cross brace is re-installed.

Another object is to provide a fastening element assembly for use with a cross member which, during assembly, accomplishes the function of correcting any misalignment or incorrect spacing of the sill members, while also serving the function of assuring security against becoming unfastened under usage.

Another object is to provide in a vehicle body a structural cross member having sill alignment washers anchored thereto in a desired spaced relationship.

Other objects and advantages of the invention will be apparent from the ensuing specification and appended drawing in which:

FIGURE 1 is a sectional view of the vehicle taken on the line 1—1 of FIGURE 2 and then rotated counterclockwise 90 degrees.

FIGURE 2 is a fragmentary schematic plan view of the vehicle body.

FIGURE 3 is an underneath view of the alignment washer.

FIGURE 4 is a corner view of the washer of FIGURE 3.

FIGURE 5 is a detail plan view of the nut which coacts with the alignment washer.

FIGURE 6 is a fragmentary sectional view through one of the fastening element assemblies.

FIGURE 7 is a fragmentary sectional view similar to FIGURE 6 and showing a modified form of fastening element assembly.

FIGURE 8 is a fragmentary sectional view similar to FIGURE 6 and showing another modified form of fastening element assembly.

In general, the vehicle body includes a sheet metal floor panel A welded integrally to the side sills B and C. The sills converge forwardly at D and E and continue with the forwardly protruding substantially parallel extensions F and G. Upwardly projecting spaced panels H and I form the ultimate side walls of the engine compartment of the vehicle and are integrally formed with the sills as by means of welding.

An upwardly projecting partition panel J (sometimes identified as a "dash" panel) is integrally welded to the side walls and serves to separate the engine compartment from the passenger compartment of the ultimate vehicle. Thus a generally U-shaped structure at the forward end of the vehicle body results—consisting of the spaced sill extensions with their upwardly projecting side walls merging with the partition panel J. It will be understood that in the fabricating of the vehicle body the forwardly protruding extensions F and G of the sills (prior to adding the cross member) are susceptible to variance from the desired ultimate dimension X—X. A cross member or brace K interconnects the forwardly protruding ends or extensions of the sills in a manner as to obtain the desired X—X dimension.

The sill members are generally of box section construction and form the principal frame members of the vehicle body. The sills extend throughout the length of the vehicle body and consist of channel-shaped stampings having outwardly turned flanges 10, 11, 12 and 13 which are welded to the side wall panels 14 and 15. The side walls H and I may also have upper sills 20 and 21 which extend lengthwise of the side walls.

Channel-shaped reinforcing members 16 and 17 are inserted within the sills and are welded thereto before the side wall panels are assembled to the sills.

Such reinforcing members may extend a few inches beyond either end of the fastening element assemblies which are identified generally by the numerals 23, 24, 25 and 26. It will be understood that there are preferably two fastening element assemblies at each end of the cross member or brace.

Viewing FIGURE 6 the fastening element assemblies include the nuts 28 which are anchored to channel members 16 and 17 as by means of welding. There are two sets of such nuts, one set on each side of the body.

Each of the nuts may be provided with an appropriate piloting shoulder 29 projecting into an appropriate bore 30 formed in the base portion 31 of the reinforcing members. The nuts 28 are accurately positioned dimensionally with reference to the longitudinal center lines of the reinforcing channel members and, consequently, the dimension X—X will be accurately obtained after the cross member K is anchored at each of its ends to the sills by means of the fastening element assemblies as will be explained more fully hereinafter.

The alignment washers 32 are anchored at each end of the cross member K as by being welded thereto and there are four of such washers, one for each fastening element assembly. The two sets of alignment washers at each end of the cross member are accurately positioned before being welded to such cross member. Thus the distance between the alignment washer at one end of the cross member and the corresponding alignment washer at the other end of the cross member is accurately determined and this dimension will ultimately establish the X—X dimension as will be explained hereinafter.

Referring to FIGURE 3, it will be seen that each of the alignment washers is provided with an elongated central opening 34 which is circumscribed by a circular tapered or frusto-conical wall 35. The crosswise dimension of the opening 34 is only slightly larger than the diameter of the threaded stud 36. In assembling the cross member K to each of the sills the studs 36 are threaded into the nuts 28 and any misalignment (or variance in the distance between the sills B and C) is accommodated by virtue of the elongated openings 34 and similar elongated (or at any rate enlarged) openings 38 (see FIGURE 6) in the base 37 of the cross member.

It will be understood that the cross member K is of generally channel shape in cross section as is best indicated in FIGURE 6. It will also be understood that the openings 38 in each end of the cross member are also elongated or enlarged and are axially aligned with the washer openings 34.

The nuts 40 are provided with a frusto-conical external wall 41 having substantially the same degree of taper as the taper of the wall 35 of the alignment washers. When the nuts 40 are tightened, the frusto-conical external wall engages one end of the wall taper 35 and commences exerting the necessary lateral force on the sills for arriving at the X—X dimension which will be final when all four of the nuts 40 are completely tightened to bottoming position as shown in FIGURE 6. When bottoming occurs, the coacting frusto-conical surfaces of nuts and alignment washers cause the studs 36 to be centered with reference to the alignment washers 34 (as shown in FIGURE 6). The frusto-conical surfaces of nuts and alignment washers also provide a superior form of security against disassembly. That is, when bottoming occurs through tightening, the resultant connection between nut and washer surfaces is highly resistant to becoming loosened under severe usage conditions. There is no need for an auxiliary locking member, such as a lock washer.

The alignment washers 32 may have their four corners struck or staked to provide the protruding ears 45 which make contact with the under surface of the cross member base for providing the points of welding of the washers to such base.

It will be understood that in the form of the invention shown in FIGURE 6, the stud may have a shoulder area 36a so that the stud can be tightened with reference to nut 28 to prevent further turning of the stud when nut 40 is tightened onto the remaining end 36b of the stud.

In the form of the invention as shown in FIGURE 7, the nuts 28a are welded to the reinforcing members 17 and they may be of the type having the four corners struck to provide ears 48 as points of welding (similar to ears 45 of the alignment washers 32). The alignment washers 32a are of the type shown in FIGURES 3 and 4 being accurately positioned and then welded to the cross member base 37. The stud 36a may be in the form of a singular bolt having the threaded shank 49 and the enlarged head 50 with a frusto-conical wall 51 for coacting with the tapered wall 35a of the alignment washers. The alignment washers, of course, are provided with the elongated openings 34b similar to those of washers 32.

The nuts 28a may be countersunk at 52 to facilitate the threading entry of the bolt shank 49 thereinto.

In the form of the invention shown in FIGURE 8 the bolt 36b may have its head 53 welded to the reinforcing member 17 and a threaded shank 54 protruding from the underside of the sill onto which the nut 40b is threaded. The nut 40b is of a construction similar to the nut 40 and coacts with the alignment washer 32b in the same manner as nut 40 does with washer 32.

Having described my invention, what I claim is:

1. A vehicle body assembly comprising: a floor panel extending longitudinally of the body; sills at either side of the floor panel, integral therewith and extending lengthwise of the floor panel; spaced side walls extending lengthwise of the floor panel and projecting upwardly from the sills; a portion of the sills and side walls projecting forwardly beyond the forward end of the floor panel to form a generally U-shaped structure; a cross member spaced from the forward terminus of the floor panel and anchored at one of its ends to one sill and at its other end to the other sill; an alignment washer anchored to one end of the cross member and having an elongated opening therein with its longest dimension directed substantially longitudinally of the cross member, said washer having a substantially frusto-conical wall circumscribing the elongated opening; an additional washer anchored at the opposite end of the cross member and spaced a predetermined distance from the alignment washer; a bolt secure with reference to one of the sills and having a threaded shank projecting through the opening in the alignment washer; means associated with the bolt for coacting with the frusto-conical wall of the washer to effect a predetermined spacing of the sills to reflect the spacing of the washers on the cross member.

2. For use with a vehicle body assembly having a floor panel extending longitudinally of the body; sills at either side of the floor panel, integral therewith and extending longitudinally thereof; spaced side walls extending lengthwise of the floor panel and projecting upwardly from the sills; a portion of the sills and side walls projecting forwardly beyond the forward terminus of the floor panel to form a generally U-shaped structure and a cross member spaced from the forward terminus of the floor panel and anchored at one of its ends to one sill and at its other end to the other sills, apparatus for effecting a predetermined spacing of the sills and side walls which form the U-shaped structure said apparatus comprising:
   (1) a fastening element assembly for anchoring one end of the cross member to one of the sills;
   (2) a female fastening element situated in a fixed location on the other sill;
   (3) a male fastening element having a threaded shank and a frusto-conical shoulder thereon;
   (4) the cross member having an opening therein larger than the diameter of the shank and said opening being circumscribed with a frusto-conical wall directed toward the frusto-conical shoulder on the male fastening element shank, whereby when the threaded shank portion thereof is engaged in the female fastening element the frusto-conical shoulder engages the frusto-conical wall, effecting lateral shifting of the sill relative to the cross member until the shank of the male fastening element is centered with reference to the opening in the cross member.

3. For use with a vehicle body assembly having a floor panel extending longitudinally of the body; sills at either side of the floor panel, integral therewith and extending longitudinally thereof; spaced side walls extending lengthwise of the floor panel and projecting upwardly from the sills; a portion of the sills and side walls projecting forwardly beyond the forward terminus of the floor panel to form a generally U-shaped structure and a cross member spaced from the forward terminus of the floor panel and anchored at one of its ends to one sill and at its other end to the other sill, apparatus for effecting a predetermined spacing of the sills and side walls which form the U-shaped structure, said apparatus comprising:
   (1) a fastening element assembly for anchoring one end of the cross member to one of the sills;
   (2) an internally threaded female fastening element situated in a fixed location on the other sill;
   (3) a male fastening element having an externally threaded shank and a frusto-conically shaped shoulder of larger diameter than the shank;
   (4) the cross member having an opening therein of larger diameter than the shank;
   (5) a washer having an opening therein of larger diameter than the shank and being anchored to the cross member at the opening therein;
   (6) said washer having a frusto-conical wall circumscribing its opening and being directed toward the frusto-conical shoulder on the shank, whereby when the shank is threaded into the female fastening element the frusto-conical shoulder engages the frusto-conical wall effecting lateral shifting of the sill relative to the other until the shank of the male fastening element is centered with reference to the opening in the washer.

4. Apparatus as set forth in claim 3 wherein the opening in the washer is of lesser dimension in width than in length whereby the shifting of the one structural member relative to the other is substantially in a single rectilinear direction.

5. Apparatus as set forth in claim 3 wherein the female fastening element is situated on the sill so as to be accessible only from one end and the male fastening element shank is separable from the frusto-conical shoulder and wherein such shoulder is formed as part of an internally threaded nut which is removably threaded onto the end of the shank remote from the end which is threaded into the female fastening element.

6. A vehicle body assembly comprising: a floor panel extending longitudinally of the body; sills at either side of the floor panel, integral therewith and extending lengthwise of the floor panel; spaced side walls extending lengthwise of the floor panel and projecting upwardly from the sills; a portion of the sills and side walls projecting forwardly beyond the forward end of the floor panel to form a generally U-shaped structure; a cross member spaced from the forward terminus of the floor panel and anchored at one of its ends to one sill and at its other end to the other sill; said cross member having alignment washers anchored at opposite ends thereof and spaced from each other a predetermined distance; said washers having openings therethrough and said cross member having openings substantially aligned with the washer openings; at least one of the washer openings being circumscribed with a frusto-conical wall; a female fastening element; a male fastening element in engagement with the female fastening element and projecting through the opening of the washer with the frusto-conical wall, said male fastening element being of smaller diameter than the washer opening; means on the male fastening element coacting with the frusto-conical wall of the washer to force the sills toward or away from each other, said means becoming effective upon tightening of the fastening elements relative to each other thereby effecting a predetermined spacing of the sills to reflect the spacing of the alignment washers on opposite ends of the cross member.

7. A vehicle body assembly comprising: a floor panel extending longitudinally of the body; sills at either side of the floor panel, secure therewith and extending lengthwise of the floor panel; spaced side walls extending lengthwise of the floor panel and projecting upwardly from the sills; a portion of the sills and side walls projecting forwardly beyond the forward end of the floor panel to form a generally U-shaped structure; a cross-member spaced from the forward terminus of the floor panel and anchored at one of its ends to one sill and at its other end to the other sill; said cross member having openings therein at opposite ends thereof, such openings being spaced from each other a predetermined distance; at least one of such cross member openings being circumscribed with a tapered wall; a female fastening element; a male fastening element in engagement with the female fastening element and projecting through the cross member opening with the tapered wall, said male fastening element being of smaller diameter than the cross member opening with the tapered wall; means on the male fastening element in the form of a tapered surface coacting with the tapered wall at the cross member opening to force the sills toward or away from each other, said means becoming effective upon tightening of the fastening elements relative to each other thereby effecting a predetermined spacing of the sills to reflect the spacing of the openings at the opposite ends of the cross member.

References Cited in the file of this patent

UNITED STATES PATENTS

| | | |
|---|---|---|
| 1,587,102 | Wrighton | June 1, 1926 |
| 2,113,075 | Breer et al. | Apr. 5, 1938 |
| 2,195,590 | Eksergian | Apr. 2, 1940 |
| 2,539,050 | Begg | Jan. 23, 1951 |
| 2,552,004 | Erdman | May 8, 1951 |
| 2,636,774 | Lindsay | Apr. 28, 1953 |
| 2,997,313 | Wall | Aug. 22, 1961 |